(12) United States Patent
Hoang (10) Patent No.: US 12,502,627 B1
(45) Date of Patent: Dec. 23, 2025

(54) MAGNETIC COUPLING ASSEMBLY FOR MODULAR FISH TANK FILTER COMPONENTS AND METHOD OF USE

(71) Applicant: Dung Minh Hoang, Cumberland, MD (US)

(72) Inventor: Dung Minh Hoang, Cumberland, MD (US)

( * ) Notice: Subject to any disclaimer, the term of this patent is extended or adjusted under 35 U.S.C. 154(b) by 555 days.

(21) Appl. No.: 18/152,864

(22) Filed: Jan. 11, 2023

Related U.S. Application Data

(60) Provisional application No. 63/316,917, filed on Mar. 4, 2022, provisional application No. 63/316,914, filed on Mar. 4, 2022.

(51) Int. Cl.
| | | |
|---|---|---|
| *B01D 35/06* | (2006.01) | |
| *A01K 63/04* | (2006.01) | |
| *B01D 35/027* | (2006.01) | |
| *B01D 35/30* | (2006.01) | |

(52) U.S. Cl.
CPC ............ *B01D 35/06* (2013.01); *A01K 63/045* (2013.01); *B01D 35/027* (2013.01); *B01D 35/306* (2013.01)

(58) Field of Classification Search
CPC .... B01D 35/06; B01D 35/027; B01D 35/306; A01K 63/045
See application file for complete search history.

(56) References Cited

U.S. PATENT DOCUMENTS

| | | | | |
|---|---|---|---|---|
| 4,024,064 | A * | 5/1977 | Rakowicz | B01D 35/06 210/416.1 |
| 8,339,226 | B2 * | 12/2012 | Fullerton | G09F 7/04 24/303 |
| 2007/0020149 | A1 * | 1/2007 | Waterbury | B01L 3/50255 422/400 |

* cited by examiner

*Primary Examiner* — Waqaas Ali
(74) *Attorney, Agent, or Firm* — Karen Tang-Wai Sutton (57) ABSTRACT

A magnetic coupling assembly for use with modular filtration components where the components include a first module, a second module, and a pump. The magnetic coupling assembly is comprised of a front array of couplers and a back array of couplers positioned on front and back of each of the first and second modules using magnet-counter magnet or magnet-ferro-magnetic materials for the couplers. The mated bonds formed between modules by the magnetic coupling assembly are insufficiently strong enough to allow one module to support another module, and the mated bonds are maintained only when the pump pulls water through the mated modules and then into the pump. The magnetic coupling assembly uses neodymium based magnets in a typical embodiment. A method of use is also described.

3 Claims, 6 Drawing Sheets

MAGNETIC COUPLING ASSEMBLY FOR MODULAR FISH TANK FILTER COMPONENTS AND METHOD OF USE

CROSS-REFERENCE TO RELATED APPLICATIONS

This application is a utility of U.S. patent application Ser. No. 63/316,914 filed Mar. 4, 2022 and U.S. patent application Ser. No. 63/316,917 filed Mar. 4, 2022, from which priority and benefit is claimed under all applicable sections of Title 35 of the United States Code including, but not limited to, Sections 120, 121, and 365(c), and which in its entirety is incorporated by reference into this application.

STATEMENT REGARDING FEDERALLY SPONSORED RESEARCH OR DEVELOPMENT

NA

NAMES OF THE PARTIES TO A JOINT RESEARCH AGREEMENT

NA

INCORPORATION BY REFERENCE OF MATERIAL SUBMITTED ON A COMPACT DISC OR AS A TEXT FILE VIA THE EFS WEB SYSTEM

NA

STATEMENT REGARDING PRIOR DISCLOSURES BY THE INVENTOR OR A JOINT INVENTOR

NA

BACKGROUND OF THE INVENTION

Field of the Invention

The invention pertains to coupling assemblies for filtration components used in fish tanks. More specifically, the invention is a magnetic coupling assembly used to removably attach a plurality of modular filtration components for a fish tank filtration assembly together, and a method of using magnetic coupling assemblies in fish tank filtration systems using modular components.

Background Art

Fish tanks are small, self-contained artificial aquatic systems designed to mimic a natural aquatic environment. Unlike the natural aquatic system, whose water quality is maintained through natural means, a fish tank requires significant mechanical, biological, and chemical filtration to sustain the cleanliness of its relatively small quantity of water for fish and plant health as well as to keep the water clear and attractive.

Given the popularity of fish as pets, many fish tank filtration systems exist on the market, including fully submersible systems to exterior, waterfall types that hang onto the side of the fish tank. A typical filtration assembly has an electric water pump that pulls water from the tank and into the filter, where the water passes through a variety of filter media to clean the water before returning to the tank. The filter media in a common hanging fish tank filter is comprised of a removable cartridge having a quantity of charcoal inside a fibrous pad supported by a plastic frame. The cartridge fits into a slot formed inside the filter chamber, where dirty water passes through one side of the cartridge through the filter material, and then exits the other side, presumably now clean, where it is then returned to the fish tank. The cartridge is designed to be disposable and replaced with a new cartridge during routine tank maintenance. Some tank filtration systems use media bags or sponges, allowing the fish owner to customize filter materials, but these have largely fallen out of favor because they are messy and much more time consuming as compared to disposable ready to use cartridges.

Filtration systems are selected in part by the size of the pump and the amount of water capable of being filtered by the hour. Larger tanks will require larger pumps in order to properly maintain water quality, and filtration systems having a single pump are not easily scalable up or down as needed. Typically, a new filtration system with a pump with a larger capacity is required for a larger tank, and a smaller tank similarly will need a smaller system as over filtration of the water is not necessarily desirable. Filtration systems, while often modular in that there is a filter chamber housing at least one or more mechanical, biological and chemical filter materials, the filter system is not easily modifiable so as to scale up or down, or customized if a fish tank owner wants to increase or decrease filter material types often due to size limitations of the internal chamber housing the filtration materials. Goldfish, for instance, are highly tolerant of dirty water and do not need extensive filtration, but expensive and exotic saltwater fish require much more sophisticated filtration systems as they are highly sensitive to water quality. Tank owners are often advised to remove charcoal filtration when dosing the tank to treat illness, however the cartridge-type filters that are prepackaged and not customizable, do not allow for such modification. As the filtrations systems themselves require cleaning, they must be disassembled and current systems use a variety of mechanical couplings, including threaded couplings and pressure fitted couplings. As use of plastic components is pervasive in filtration systems, these couplings can be difficult to decouple after exposure to water and often become brittle and easily damaged by constant exposure to minerals in the water.

What is needed is a new coupling assembly for modular filtration system components that minimizes wear and tear on the components yet is capable of withstanding water pressure from the pump and easy coupled and uncoupled without damaging the components or requiring complete disassembly of the components.

What is also needed is a method of using magnetic coupling assemblies with modular filtration components in a fish tank application.

DISCLOSURE OF INVENTION

A magnetic coupling assembly for modular filtration components used to filter water in a fish tank according to the invention 100 has at least two modules, a first module and a second module, each module having a front and an opposed back, with an array of magnetic front couplers on the front and an array of magnetic back couplers on the back, the arrays positioned such that when the at least two modules are positioned back to front, the back and front couplers form a mating bond. The front couplers and back couplers are magnet-counter-magnet or magnet-ferromagnetic material such that the front and back couplers are magnetically mated together when positioned immediately adjacent one another.

In yet a second aspect of the invention, the magnetic coupling assembly is further comprised of a pump magnetically coupled to the second module by a pipe and arranged such that the pump pulls water through the modules into the pipe and then into the pump.

In yet a third aspect of the invention, the front couplers and the back couplers are each arranged on opposed sides of the respective front and back of each module.

In yet a fourth aspect of the invention, the arrays of magnetic couplers on the front side and on the back side are comprised of neodymium-based button magnets having a predetermined mating bond strength, where the mating bond strength of the arrays of magnetic couplers is insufficient to maintain the mating bond between the first module to the second module when the pump pushes water through the modules, and where the mating bond of the first module to the second module is maintained when the pump pulls water through the coupled first module and the second module.

In yet a fifth aspect of the invention, a method of using the magnetic coupling assembly with a modular filtration assembly having three or more individual modular filter components arranged linearly and a pump comprises the steps of selecting a desired number of filter modules, arranging the filter modules in a desired arrangement where a last module in the module arrangement is a terminal module, mating the filter modules by positioning a front of one module immediately adjacent a back of a next module, and coupling the terminal filter module to a pump intake of the pump.

In a sixth aspect of the invention, the method includes a step of twisting immediately adjacent mated modules in opposite directions to break the mating bond and separating and rearranging the modules as desired.

BRIEF DESCRIPTION OF THE DRAWINGS

The features and advantages of the invention will become apparent from a consideration of the subsequent detailed description presented in connection with accompanying drawings, in which.

DRAWINGS LIST OF REFERENCE NUMERALS

The following is a list of reference labels used in the drawings to label components of different embodiments of the invention, and the names of the indicated components.

100 magnetic coupling assembly
10 filter module or module or component
10a upper end
10b lower end
10c front opening
12 front side or front
14 back side or back
14a slotted back
16 front coupler
18 back coupler
19 magnet
20 pump
20a pump intake
20b pump outflow
22 buffer module
22a buffer end of pipe
22b pump end of pipe
22d pipe coupler
26 pipe or fitting
200 method of coupling modular filtration components
202 step of selecting
204 step of arranging
206 step of mating
208 step of coupling
210 step of twisting
212 step of separating and rearranging

DETAILED DESCRIPTION

Figure 6:
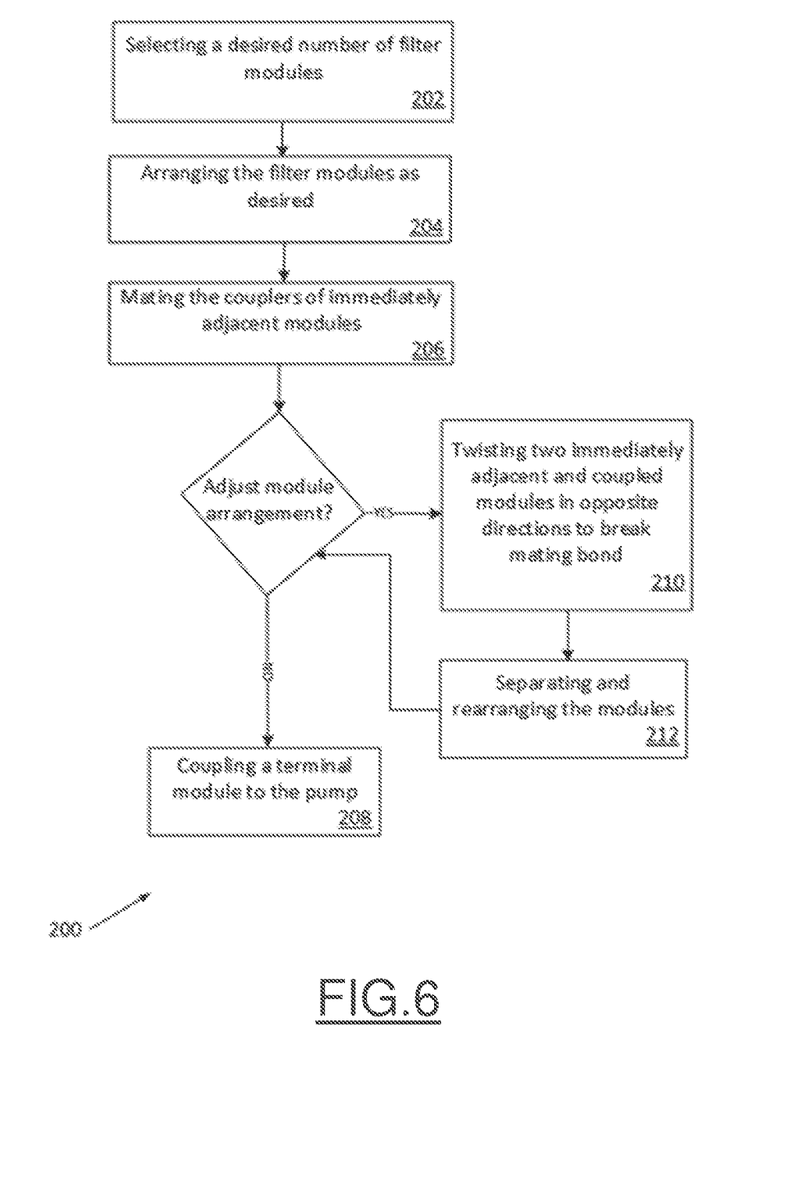
FIG. 6 is a flow diagram showing a method of using the magnetic coupler assembly in FIGS. 1-5.

A magnetic coupling assembly according to the invention 100 for modular filtration components is shown in FIGS. 1-5, where two representative embodiments of a modular filtration assembly and pump for a fish tank are shown. A method 200 of using the assembly 100 is shown in FIG. 6. In this disclosure, the term "component" or "components" generally refer to any modular parts of a modular filtration assembly, and includes filters, pumps and anything that is typically used with a fish tank filtering system.

Turning to FIGS. 1-4, a modular filter assembly is shown as being comprised of one or more modules 10 sized and shaped to receive a quantity of filter material and adapted to be attached to a pump 20. In the representative embodiment shown, a terminal module, that is, the module immediately adjacent the pump 20, is configured as a buffer module 22 that couples to the pump 20 by a fitting or pipe 26 magnetically mating to a pipe end or pipe coupler 22d of the buffer module 22 at a buffer end 22a of the pipe 26, and to a respective pump intake end 20a of the pump 20 at a pipe end 22b of the pipe 26, replacing the prior art method of threaded or pressure-fitted parts mating the filtration components together. In the representative embodiment shown, the buffer module 22 and a plurality of filter components or filter modules 10 are each further fitted with the magnetic coupling assembly 100, shown in the FIGS. as magnetic couplers organized in a front array of front couplers 16 and a back array of back couplers 18 arranged on both an upper end and a lower end of each module 10, with the front array on a front side 12 of the module 10 and the back array on a back side 14 of each module 10, where the front and back arrays are arranged so that an adjacent back array on one module will mate with an immediately adjacent front array on another module.

In the representative embodiment shown in the FIGURES, each array is shown as three couplers in spaced apart relationship on the upper and lower ends of each module 10 front side 12 and back side 14, plus an additional pair of couplers on a left and right side of the front side 12 and the back side 14. The inventor notes that each array can also be as few as two couplers per side, arranged on upper and lower ends of the module 10, or alternatively, on opposed left and right sides of the module 10. Instead of discreet buttons, as shown in the representative embodiment in the FIGURES, the couplers could be bars or other shapes disposed on the front or back of each module 10. While it is possible to have couplers on the top, bottom and left and right sides, depending on the application, ideally the fewest number of couplers are used. The arrays of magnetic couplers 16 on the front side 12 are formed so as to have an outwardly facing north or south pole of the magnet 19, and the array of magnetic couplers 18 on the back side 14 are formed with either a magnetic material such as ferromagnetic metal or another magnet with the outwardly facing side opposite that of the front magnetic coupler 16. Hence, in this disclosure, the term "magnetic coupler" or "magnet" includes ferromagnetic materials as well as magnets and counter-magnets. Also, the inventor stresses that if the magnetic coupler on the front side 12 has an outwardly facing north pole, the magnetic coupler 18 on the back side 14 has an outwardly facing south pole. Hence, in some embodiments, the magnetic couplers 16 18 are magnet-counter magnet parts, in others, magnets and magnetic metallic pieces are used as couplers, and combinations of both on a same side are also possible. The couplers 16 18 are coated to protect against corrosion or damage by water.

The location of the magnetic couplers 16 18 on the modules 10 in the representative embodiment in the FIGS. is meant to demonstrate suitable coupler positions that will allow easy decoupling when maintenance of the filtration components is required, by allowing the user to twist the components to decouple the magnets. If the couplers 16 18 are positioned on all four sides as shown in the representative embodiment in the FIGURES, decoupling will be more difficult, and in a typical embodiment the array of couplers will be either on left and right sides or top and bottom. The representative embodiment in the FIGS. shows couplers 16 18 on all four sides to illustrate suggested positions along the front 12 and back 14 of the module 10 and positioning couplers 16 18 on all four sides should only be used for applications where extra holding power of the modules is required. The inventor stresses that the coupling assembly 100 is designed to work with water pressure to hold the modules, pipe and pump together, and without the water pressure the coupling assembly 100 is not designed to support all the modules together such that the magnetic bond formed by the magnetic coupling assembly could support the weight of the modules if a single module is lifted and the rest are not supported, or if water is pushed through the mated modules by the pump rather than pulled through the modules. The use of magnetic couplers with a magnetic strength that would mate the modules together to withstand such use would tend to negate many of the benefits of using magnets to removably couple the components as breaking the magnetic forces in such cases would tend to put undue stress on the rest of the component bodies, a current known issue with the prior art coupling structures such as pressure or threaded fittings to mate components and maintain a relative position of the components within an operational filter subject to water forces.

Figure 1:
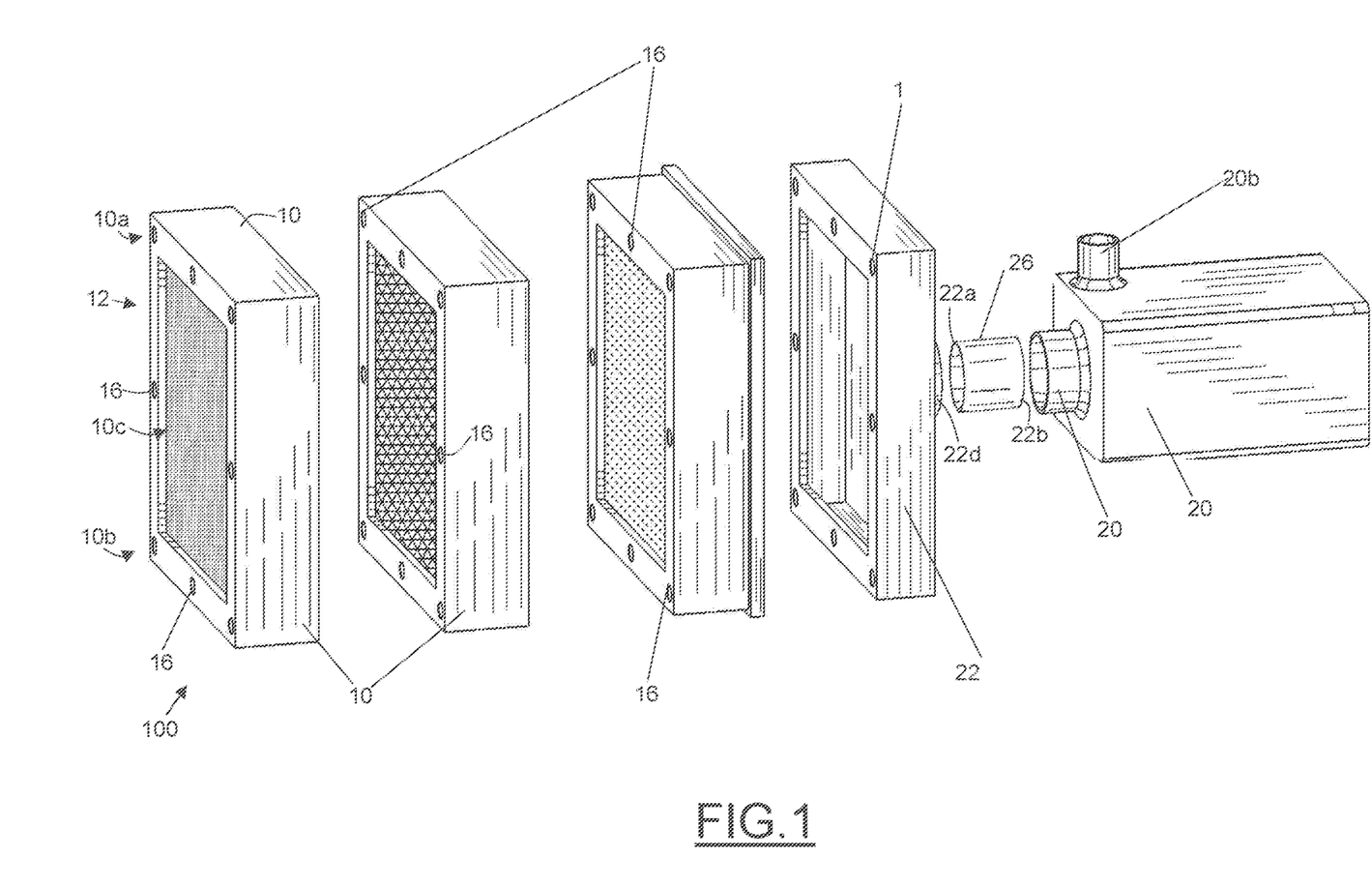
FIG. 1 is a first exploded perspective view of one embodiment of a modular filter assembly and pump, with a magnetic coupling assembly disposed on the modular components, replacing tradition threaded and pressure fitted couplings used to connect the modular components together and to the pump.
Figure 2:
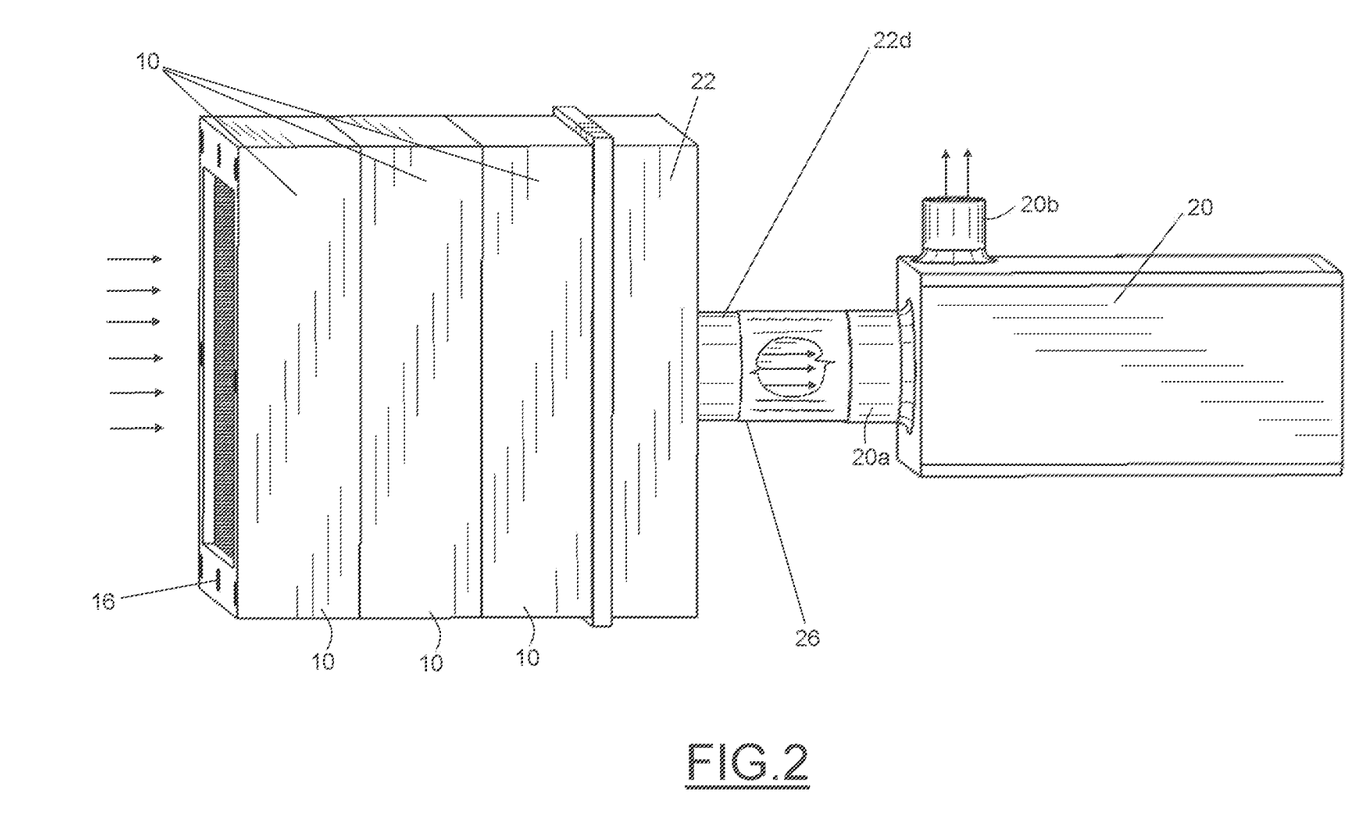
FIG. 2 is a perspective view of the embodiment in FIG. 1, shown in a use position, where the modules and pump are magnetically coupled and showing a direction of water flow through the modules and pump.
Figure 3:
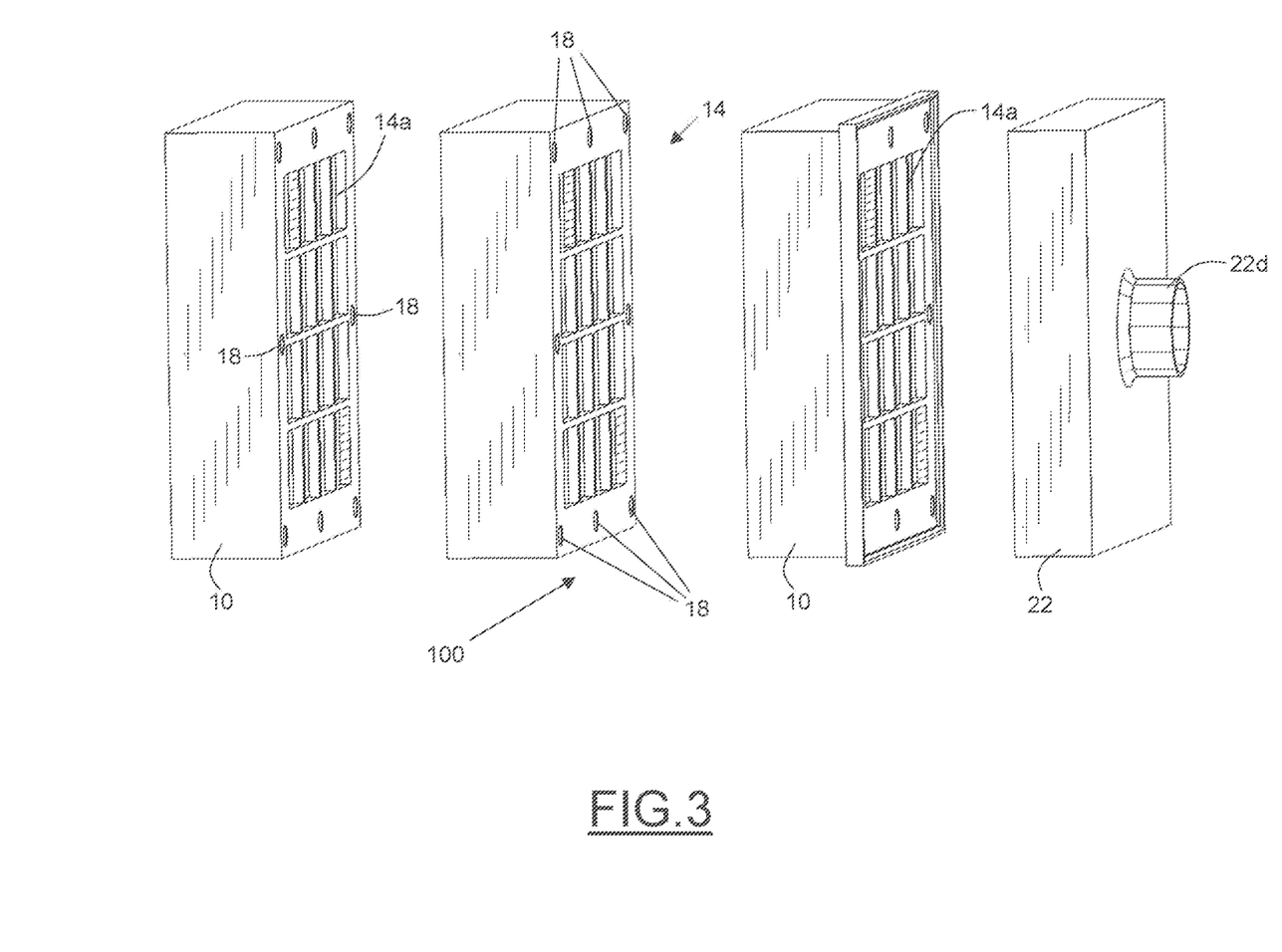
FIG. 3 is a second perspective exploded view of the modules in FIGS. 1-2.

The magnetic coupling assembly 100 for the filtration system components are meant to be used with modular filtration components, such as shown in the representative embodiment in FIG. 2, in which a water flow direction, shown by arrows in the FIGS. creates pressure that further assists the magnetic couplers 16 18 and the coupled modules 10, pipe 26 and pump 20 to stay together when in use, that is, when the pump 20 is operational and water is being filtered through the modules 10. The pump 20 must pull water through the magnetically coupled modules 10, rather than push water through the modules 10. Water flow direction allows for the use of relatively weak magnets for the coupling system 100, keeping costs low and hence the direction of the flow of water being pulled or sucked into the modules 10 by the pump 20 is a critical feature of the present invention. Thus, the magnetic couplers (and ferro-magnetic based couplers) used are relatively weak, where the mating bond is easily broken by a user twisting one or both modular components to decouple the components, where the mating bond can be broken when water is not being pulled through the mated modules, and where the magnets or ferro-magnetic materials used as couplers cannot support the weight of one module when only one of a pair of mated modules is supported, such as in the case of routine maintenance when the user cannot simply lift one module and expect the magnetic coupling assembly 100 to keep all the components together.

The use of magnets to removably attach objects to each other is a known method of removably mating objects together, such as using magnets to attach lightweight items to one's refrigerator or to a magnetic reminder board, and it is known in the art that stronger magnets must be used when one item's mass is entirely supported by the magnet when coupled to another item, for instance, a knife coupled to a magnetic knife holder screwed to a wall. The magnetic bond thus must be sufficiently strong to support the weight of the item and it is not known in the art to use a secondary method to assist the magnet; the strength of the magnetic coupling alone is used to hold the mated items together.

In the present case, the magnets used are not strong enough by themselves to hold the filter components together but rely on water pressure from the pump flow rate to work in conjunction with the magnets and this use of magnetic forces plus water pressure is neither taught nor suggested in the prior art as it would pertain to the problem of removably attaching modular components of filtration systems together. The modular components have a tendency to pull apart when subject to water pressure. The current teaching is to use pressure fitting or threaded attachments as these are inexpensive and secure ways to attach components that must be able to endure the pressure of constant water flow around and through those components. A known problem in the prior art is the securing of filter components subjected to constant water movement, and this is why tight pressure fittings and threaded connections are the standard methods of securing parts in a filtration system. These types of connections are often difficult to remove as mineral deposits tend to form on them, and the constant exposure to water and minerals tends to make plastic components brittle, combined with the tugging or twisting to unscrew threaded parts leads to breakages and other damage to the components. The prior art neither suggests nor teaches the harnessing of the pressure caused by the directional flow of water through the pump and the components as a way to couple the components together and in fact teaches that components must be secured mechanically to prevent the water's constant directional flow from dislodging the components. Thus, the inventor's magnetic coupling assembly 100, instead of resisting water pressure, uses the pressure to keep components together, the opposite of what is taught by the prior art. A magnetic strength of the magnetic couplers 16 18 varies depending on many factors, including size of the modules, physical arrangement, such as vertically or horizontally stacked, whether the modules are fully submerged in water or outside the tank, and a flow rate of the pump. For a fish tank ranging from 5 to 10 gallons, having one or more filter modules sized to house 5 cm diameter sponge pads, four pairs of 2 mm thick 6 mm DIYMAG™ 6 mm neodymium button brand magnets are used to couple the modules together for pump flow rates ranging from 30 to 90 GPH, although such flow rates are highly dependent on the fish stocked in the tank. DIYMAG™ magnets are neodymium-iron-boron (NdFeB) readily available for sale at Amazon.com at https://www.amazon.com/gp/product/B07KJ9H31P?th=1.

For a 30 gallon or 55 gallon tank, the modules have a filter diameter of about 10 cm, and the magnetic couplers 16 18 would typically are configured as 8 pairs of 10 mm magnets from DIYMAG™ arranged on opposed ends of each module, where pump flow rate range from 120-450 GPH. The inventor notes that these two examples are meant to be illustrative only of the magnet strength in relation to the filter component sizes and water flow rates and is thus not meant to limit the invention to the examples provided, whether they are scaled up or down accordingly. Some fish tank owners may prefer relatively stronger or weaker magnetic coupling of the components, depending on factors that include maintenance frequency, and perhaps even the type of fish in the tank. The inventor's use of neodymium-based button magnets are cost effective and provide sufficient strength to allow coupling but not so strong as to hinder decoupling. The inventor notes that given the wide range of hand and arm strength of fish tank owners, there is an acceptable range of magnetic strengths for the couplers and thus customers choice will establish the desired range. Hence, the use of neodymium button magnets is not mean to be limiting but rather to provide an example of an effective magnet for use in the array of magnetic couplers that has been shown to be useful.

Figure 4:
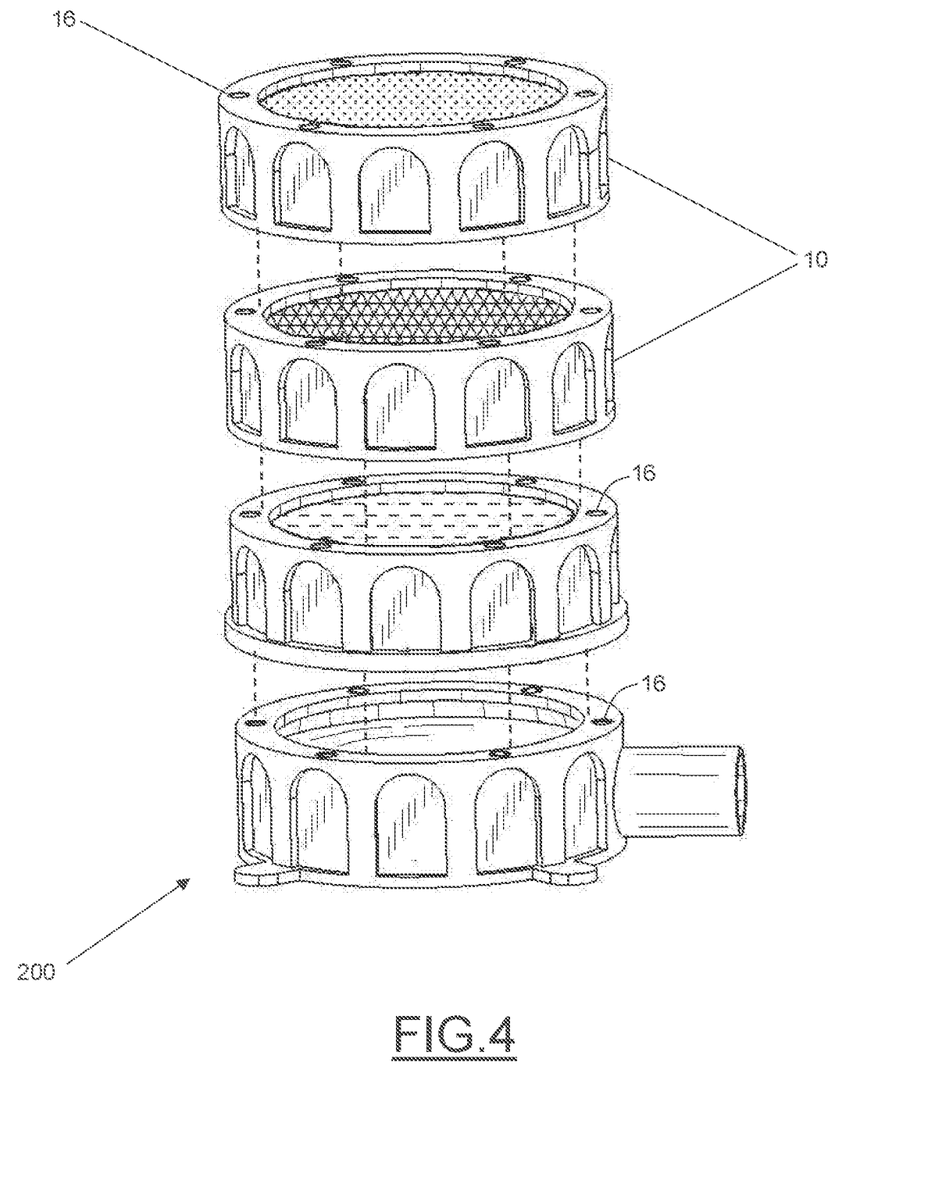
FIG. 4 is an exploded view of the modules, shown in a second embodiment where the modules are arranged vertically and a lowermost portion is either a filter module or a pump.
Figure 5:
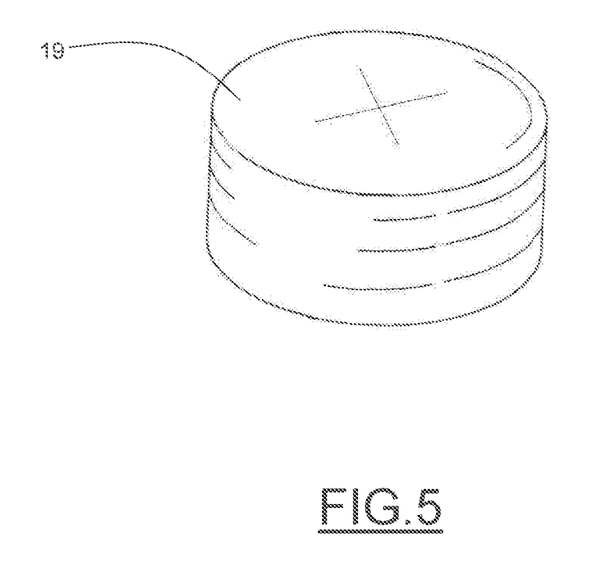
FIG. 5 is a perspective view of a magnet suitable for use as a coupler.

FIG. 4 shows a second embodiment of the modular filtration modules 10, arranged as a vertical stack of modules and with a lowermost component configured as the buffer module 22 to then be coupled to the pump 20, or as the pump itself, with the buffer module being a penultimate module directly above the lowermost component that is in fact the pump 20. In the latter case, the pipe 26 is not needed and the pump 20 pulls the water through all the modules 10 and then out through the outflow pipe to return the filtered water to the tank.

The inventor notes that in the prior art, fully submersed pump-filter systems are often housed in a single housing to keep all the components together, as thus cleaning is less convenient for the user as the housing must be taken apart to allow access to the filter modules. The inventor notes that the linear modular system shown in the FIGS. is just one way to configure the filter components in a way that is easy to access any one specific filter module 10 without disturbing the entire filtration system.

The modules shown are rectangular in the representative embodiment, however the inventor stresses that they can be any shape such as cylindrical so long as they suit the purpose of the application. The magnetic coupling assembly 100 allows for quick and easy modification of the filtration system, speeding up maintenance and reducing filter downtime. The inventor notes that the number and order of the modules and even the use of the buffer module can be altered as desired by an end user, and the filtration system thus scaled up or down by easily swapping in new magnetically coupled parts, including the pump, to increase or decrease water filtration rate, or to provide specialized filtration needs.

Another example of how the magnetic coupling assembly 100 described herein can be used to modify existing filtration components is to adapt the ends of silicone hoses with magnetic couplers to allow the ends to be coupled to pumps instead of using clamps or other pressure-based fittings. In particular, hoses attached to pumps that supply water to the pump are best suited for use with magnetic couplers, since the direction of the water pressure will naturally keep the pump and the hose together. In the representative embodiments shown in the FIGURES, the pipe 26 has its buffer end 22a magnetically connecting to the pipe coupler 22d of the buffer 22, and the opposed pump end 22b of the pipe 26 magnetically connected to the pump intake 20a. The pipe 26 itself or just the ends 22a 22b could be a magnet and the pipe coupler 22d and the pump intake 20a are counter-magnets, or vice versa, or be magnet-ferro-magnetic material arrangements. As the water pressure flowing through the pipe 26 will tend to put pressure on the mating bonds, the inventor believes that stronger magnets compared to those used for the modules will be required, although he stresses that the mass of the coupled modules and the pump should be sufficient to help maintain the mating of the pipe 26 to the buffer and to the pump. The inventor notes that while not shown in the representative embodiment, the mating ends 22a 22b 22d 20a could each also include a flange or collar to allow easier magnetic mating by increasing the mateable surface area of the respective ends.

To use the magnetic coupling assembly 100, the method 200 steps are as follows:
(1) Select a desired number of filter modules 202, typically based on the type of filter material insert used, the type of fish, and the size of the tank;
(2) Arrange the filter modules 204 as desired;
(3) Mate the couplers of immediately adjacent modules, with the back couplers 18 of the first module 10 mating with the front couplers 16 of the second module;
(4) If unsatisfied by the arrangement, or in cases where the modules require maintenance, twisting two immediately adjacent and coupled modules in opposite directions to break the mating bond 210;
(5) Separating and rearranging the modules as needed 212;
(6) Coupling a terminal module to the pump 208, the terminal module being a last module in the module arrangement.

In another step, not shown, the pump is also magnetically mated to the modules 10 via the pipe 26 and are similarly separated by twisting the pipe 26 and the pump 20, or the pipe 26 and the terminal module 22, as needed to decouple and rearrange the components. The use of relatively weak magnets in the coupling assembly 100 allows for the quick and easy coupling and decoupling of the modular components, with minimal mechanical stress on the components and minimal effort by the user. Once the pump 20 is turned on and water is pulled through the modules 10 22 and the pump 20, the water pressure helps maintain the mated bonds formed by the coupling assembly 100.

It is to be understood that the above-described arrangements are only illustrative of the application of the principles of the present invention. Numerous modifications and alternative arrangements may be devised by those skilled in the art without departing from the scope of the present invention.

I claim:

1. A magnetic coupling assembly for modular filtration components having a first module and a second module for use with a pump, each of the first module and the second module having a front and an opposed back, the magnetic coupling assembly comprising:

an array of front couplers affixed to the front of the first module and to the second front of the second module; and an array of back couplers affixed to the opposed back of the first module and to the second back of the second module;

wherein the array of front couplers has an outwardly facing magnet or is a magnetic material;

wherein the array of back couplers is either a counter-magnet to the magnet of the front couplers or a magnetic material attracted to the array of front couplers, wherein the array of back couplers of the first module magnetically mate to the array of front couplers of the second module when the first module is positioned immediately adjacent the second module, forming a mating bond;

wherein a mating bond formed by mating of the front and back couplers is maintained when the pump pulls water through the first and second modules and into the pump; and wherein the modular filtration components include a buffer module having a front side and a back side, and the magnetic coupling assembly further comprises an array of magnetic couplers disposed on the front side of the buffer module adapted to couple with the array of magnetic couplers on the back side of the second module; and a pipe having a first end adapted to magnetically couple to the back side of the buffer module and a second end adapted to magnetically couple to the pump.

2. The magnetic coupling assembly in claim 1, wherein the front of each of the first module and the second module is further comprised of opposed sides and the array of front couplers is positioned on either an upper end and lower end of the front or on a right side and left side of the front.

3. The magnetic coupling assembly in claim 1, wherein the arrays of magnetic couplers on the front side and on the back side of each of the first module and the second module are comprised of neodymium-iron-boron magnets.

* * * * *